United States Patent [19]

Scanland et al.

[11] 4,165,597
[45] * Aug. 28, 1979

[54] CUTTER PIN FOR ROTARY MOWER

[75] Inventors: Joseph E. Scanland, Savannah, Ga.; Gerald C. Fisher, Shelby, Ohio

[73] Assignee: Roper Corporation, Kankakee, Ill.

[*] Notice: The portion of the term of this patent subsequent to Jan. 3, 1995, has been disclaimed.

[21] Appl. No.: 756,329

[22] Filed: Jan. 3, 1977

Related U.S. Application Data

[63] Continuation-in-part of Ser. No. 611,347, Sep. 8, 1975, abandoned.

[51] Int. Cl.² ............................................. A01D 55/18
[52] U.S. Cl. ..................................................... 56/295
[58] Field of Search ................ 56/12.7, 295, 255, 256, 56/320.1, 320.2, 50, 400.01, 400.21; 172/15; 30/276

[56] References Cited

U.S. PATENT DOCUMENTS

| | | | |
|---|---|---|---|
| 464,852 | 12/1891 | Canuteson | 56/50 |
| 816,486 | 3/1906 | Long | 56/400.01 |
| 1,780,748 | 11/1930 | Fisher | 56/400.21 X |
| 2,645,892 | 7/1953 | Weems | 56/50 |
| 2,888,993 | 6/1959 | Dunning | 172/15 |
| 3,684,027 | 8/1972 | Crawford | 172/15 |
| 4,054,992 | 10/1977 | Ballas | 56/12.7 X |

Primary Examiner—Russell R. Kinsey
Attorney, Agent, or Firm—Leydig, Voit, Osann, Mayer & Holt, Ltd.

[57] ABSTRACT

As an article of manufacture, a tapered cutter pin for a rotary mower formed of durable resilient plastic having a shank and terminating at its outer end in a relatively thin but stiffly resilient tip portion, the shank having a head at its inner end for retaining the pin in the disc. With the pin supported cantilever fashion adjacent the head, the bending modulus in the shank is a minimum of 50 in.²-lb and at the tip is a maximum of 30 in.²-lb and the initial deflection ranges between 0.5 and 3.0 inches of tip deflection per pound of force. In the preferred embodiment the pin has four evenly spaced flutes extending longitudinally over a portion of its length and of a depth approximately proportioned to the thickness of the pin, the flutes defining between them ribs to produce a cruciform cross section.

16 Claims, 12 Drawing Figures

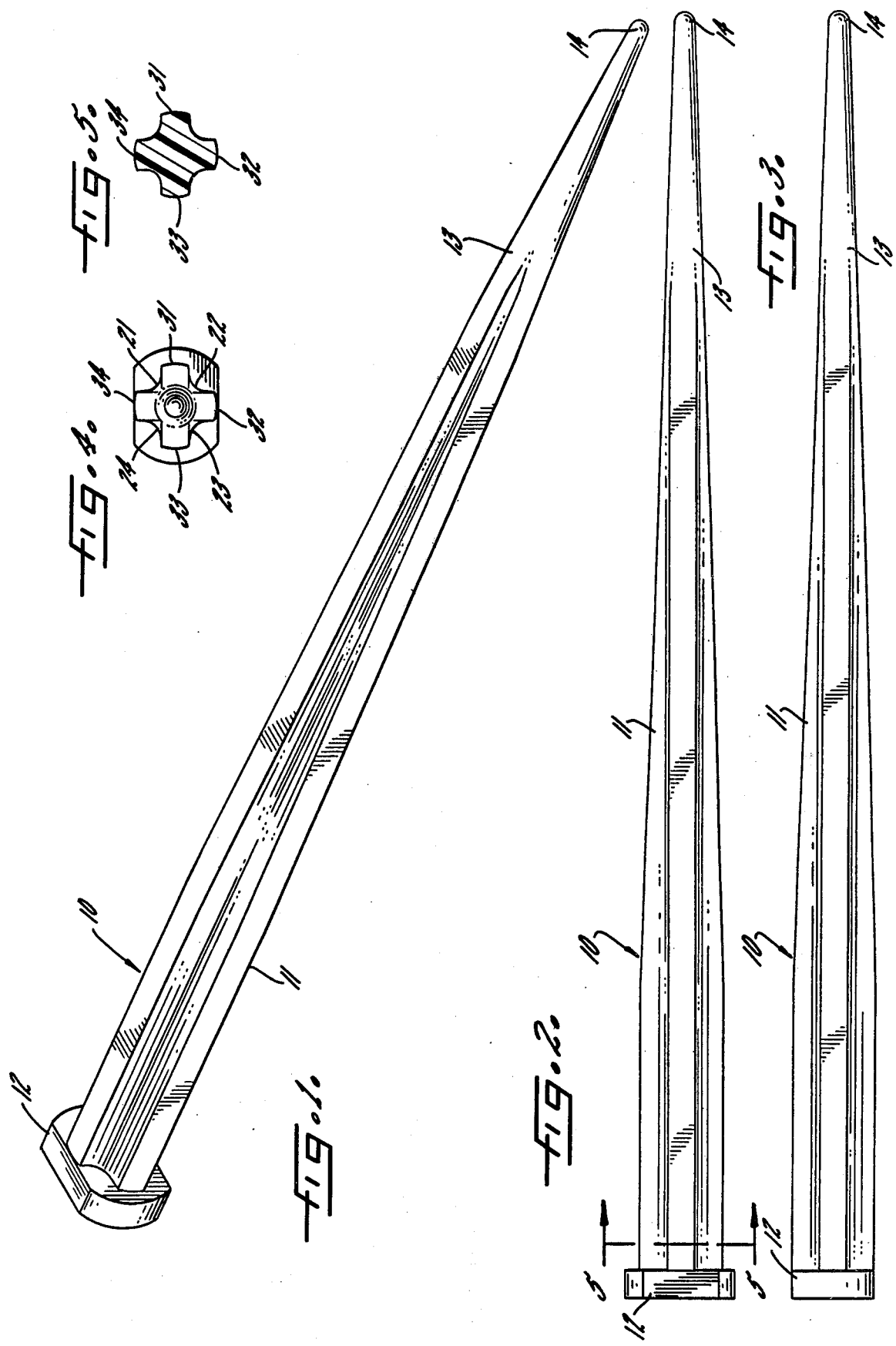

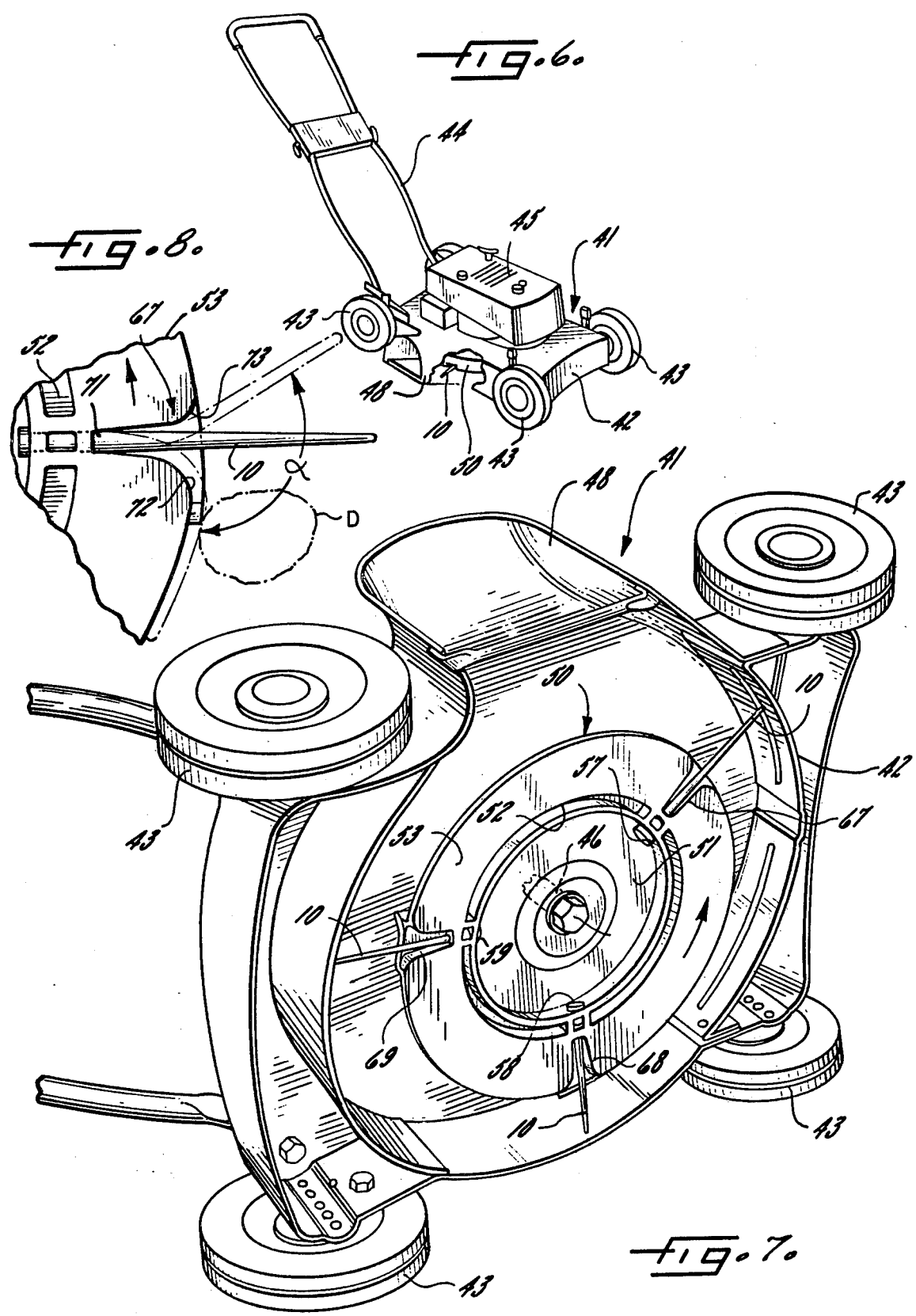

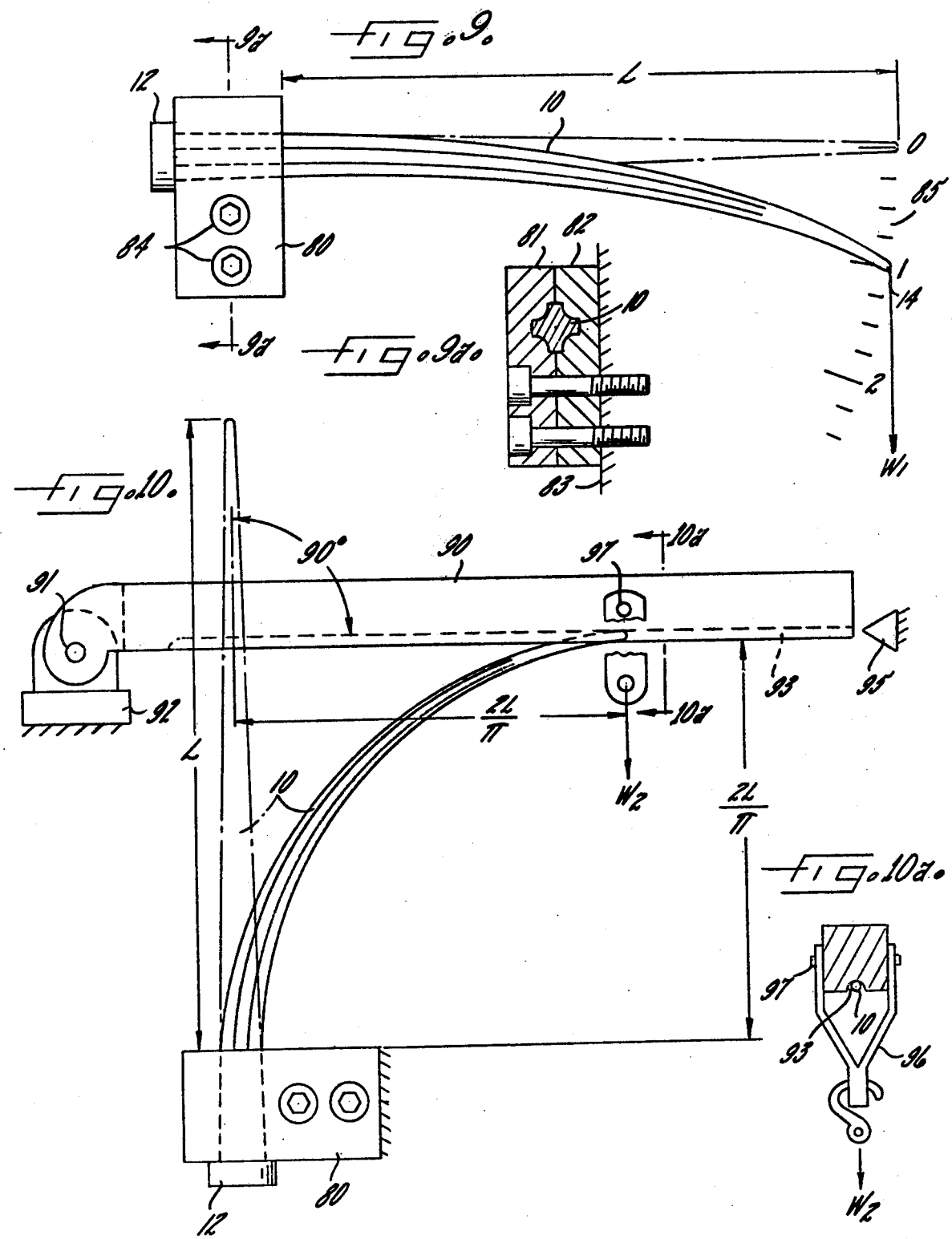

CUTTER PIN FOR ROTARY MOWER

This is a continuation-in-part of application Ser. 611,347 filed Sept. 8, 1975 now abandoned and replaced by Ser. 766,377 Filed Feb. 7, 1977 (now U.S. Pat. No. 4,065,913) and application Ser. 714,982 filed Aug. 18, 1976.

In the original form of rotary lawn mower, a steel blade having sharpened edges is rotated at high speed parallel to the ground for cutting of grass, weeds and the like. It has long been recognized that a steel blade with a sharp edge and high inherent inertia constitutes a severe safety hazard, and consideration has been given to reducing this hazard by replacing steel with flexible plastic. Joyner U.S. Pat. No. 3,156,082 which issued in Nov., 1964, for example, shows substitution of polyethylene or the like. Ely in U.S. Pat. No. 3,302,377 which issued in February of 1967 teaches use of a molded rubber blade reinforced by fibers. Wixson in U.S. Pat. No. 3,303,637 which issued in February of 1967 shows replacement of the arms of a metal blade with loops of resilient wire. Ely in U.S. Pat. No. 3,340,682 which issued in September of 1967 and Freedlander et al. in U.S. Pat. No. 3,389,541 which issued in June of 1968 are further examples of conventionally shaped blades formed of elastomeric material.

Voigt U.S. Pat. No. 3,104,510 which issued in September of 1963 is an example of a blade of conventional rectangular form used with a "whip" and in which a resilient bumper extends along the leading edge the full length of the "whip" for improving efficiency in the cutting of grass or weeds growing adjacent a fixed obstacle. The "whip" is flat-sided with transverse grooves or serrations.

To overcome the disadvantages of a conventional blade, Daggett in U.S. Pat. No. 2,557,598 which issued in June of 1951 discloses use of a disc having replaceable, radially-projecting wires. Use of radially-projecting wires is also proposed in the Dunlap et al. U.S. Pat. No. 3,208,209 which issued in September of 1965.

In an effort to reduce the hazard presented by a conventional fixed cutter, various inventors have disclosed the use of pivoted flailing elements. Wire flails are proposed in Boggs U.S. Pat. No. 2,538,230 which issued in January of 1971 and in Diesterweg U.S. Pat. No. 3,018,602 which issued in January of 1962, both of these devices being intended for trimming purposes. The use of a disc having sharpened metal blades is shown in Kirk U.S. Pat. No. 3,320,732 which issued in May of 1967, Zweegers U.S. Pat. No. 3,389,539 which issued in June of 1968 and Geier U.S. Pat. No. 3,905,182 which issued in September of 1975.

Frick in U.S. Pat. No. 3,474,608 which issued in October of 1969 shows use of a rotated carrier of "snail" shape having plastic cutting elements 52 mounted along the edge which may be either freely pivoted or crimped in place. The leading edge of the carrier in such construction is capable of striking a hammer blow, and most of the cutting will be done, not by the cutting elements, but by the leading edge of the snail which, extending to a point of maximum radius, is first to engage the standing grass or weeds.

As a separate line of development, inventors became intrigued with the possibilities of cutting grass and weeds using a whirling filament of nylon or the like. An early example of the use of a whirling filament occurs in French Naveau U.S. Pat. No. 1,281,450 which issued in December of 1961 and in French Reber Pat. No. 6,914,884 which issued in May of 1969. A similar line of development occurred in Germany as evidenced by Langenstein German Pat. Nos. 6,919,841, 6,919,842 and 6,919,844 which issued in April of 1969, 6,938,165 which issued in September of 1969 and the Vogelenzang Pat. No. 1,657,039 which issued in October of 1970. The latter patent shows unwinding of filamentary cutters from central spools but does not specify the material of which the filament is made. A more recent German design is the Adlus "UFO" trimmer in which a filament is led outwardly between rounded surfaces on adjacent buttons on the underside of a rotating disc.

In the U.S., the use of rubber flails impacting vegetation near fence posts or other obstructions is disclosed in Huff et al. U.S. Pat. No. 3,444,674 which issued in May of 1969. Curtis et al. U.S. Pat. No. 3,410,064 which issued in November of 1968 shows a "plant knocker" utilizing strips of tire casing. The use of thin whirling filaments is disclosed in all of the following U.S. patents: Geist U.S. Pat. No. 3,708,967 which issued in January of 1973, Voglesonger U.S. Pat. No. 3,831,278 which issued in August of 1974 and Ballas U.S. Pat. No. 3,826,068 which issued in July of 1974 and 3,859,776 which issued in January of 1975.

All of the above mower patents are directed toward cutting of grass while attempting to reduce the hazard presented by a sharpened, whirling rectangular steel blade. Sufficient time has now elapsed to be able to form a judgement as to whether the aspirations of the inventors in these and similar patents have been realized. It is apparent that the problem of a weighty blade delivering a solid hammer-like blow has not been avoided in the patents issued to Joyner, Ely, Freedlander and Voigt. The structures in such patents, even though more yielding than a conventional steel blade, are nevertheless fully capable of hammering stones and other debris from the mower at high speeds.

In the Daggett and Dunlap et al. patents which teach the use of a disc with radially extending wires, missile throwing capabilities are reduced, but the wires are subject to concentrated stress, with breakage and bending. The same is true of the devices in the Boggs and Diesterweg patents.

The idea of using a disc with pivotally mounted metal blades or flails as shown in the patents to Kirk, Zweegers and Geier has reduced, but only in minor degree, the hazards inherent in a sharpened steel blade rotated at high speed, while raising the possibility that a blade may become stuck in a rotated, non-cutting position. The device in the Frick patent is considered to be relatively dangerous and ineffective.

The remaining patents which employ a thin filament, uncoiled from a spool or the like, sacrifice cutting efficiency almost entirely to considerations of safety to the point where the devices are not capable of production cutting of a lawn or other area. The devices rely upon centrifugal force to maintain the cutting elements extended, and since such force is limited, the cutting elements tend to lay back into an ineffective position when cutting all but the lightest vegetation. As a result, cutters of the filamentary type have not been employed, as a practical matter, in full sized rotary mowers, and their use has been limited to light trimming operations. Even where used only for light trimming and edging, a filament is subject to a high degree of wear and almost constant breakage, which explains why such filaments are conventionally supplied in continuous form from a supply spool from which new filament is payed out as required. Sometimes instead of breaking off the ends will "split" or "brush" which further reduces cutting efficiency.

While efforts to achieve a cutting efficiency comparable to that of a steel blade combined with improved safety, both in the striking of an obstruction and in the throwing of missiles, have brought about a proliferation of cutter designs, no design, as far as is known, has been able to achieve the desired goal as shown by practical testing, as indicated by absence of mowers of such designs in the commercial market, and by the continued widespread use of the original rectangular steel cutter blades, notwithstanding their recognized hazards.

It is an object of the present invention to provide, as an article of manufacture, a cutter pin made of durable resilient plastic which may be radially mounted, cantilever fashion, in an opening formed in a disc, with the tip portion of the pin projecting radially outward from the disc to provide a cutting edge which is effective in the cutting of vegetation but which is capable of yielding upon striking a weighty obstruction to reduce the likelihood of damage or injury. It is a more specific object of the present invention to provide a cutter pin for a rotary mower which is safer than the sharpened steel blade normally employed and which, upon striking the hand or foot of the operator, tends to bend or yield to an out-of-the-way position for protective purposes. It is a related object of the invention to provide a plastic cutter pin for a rotary mower which is sufficiently stiff to cut vegetation but which is sufficiently yielding and resilient so that upon striking a stone or other piece of debris, the debris does not tend to turn into a high-speed missile capable of producing injury at a distance.

It is a general object of the present invention to provide a plastic cutter pin for a rotary mower which is of such tapered construction as to bend with gradual and distributed curvature thereby to reduce concentration of stress to secure a long life without breakage due to wear, "notching", or fatigue. It is a related object to provide a cutter pin which resists abrasion by impact with obstacles as well as wearing away at the tip, thereby maintaining initial cutting effectiveness. It is a still further object of the invention to provide a plastic cutter pin which is not only inherently long wearing but which may be replaced at the cost of only a few cents whenever the degree of wear makes replacement necessary.

Other objects and advantages of the invention will become apparent upon reading the attached detailed description and upon reference to the drawings in which:

FIG. 1 is a perspective view of a plastic cutter pin constructed in accordance with the present invention;

FIGS. 2 and 3 are plan and elevational views, respectively, of the cutter pin shown in FIG. 1;

FIG. 4 is an end view;

FIG. 5 is a section taken through the thickest portion of the shank and looking along line 5—5 in FIG. 2;

FIG. 6 shows, in perspective, a typical rotary mower in which the improved pin is employed;

FIG. 7 is a perspective view of the under side of the mower of FIG. 6 showing the disc in which the pins are mounted;

FIG. 8 shows a fragment of the peripheral portion of the disc shown in FIG. 7 and illustrating the flexing of the cutter element which may occur with the element in use.

FIG. 9 shows the test set-up used for determining initial bending modulus;

FIG. 9a is an end view looking along line 9a—9a in FIG. 9;

FIG. 10 shows a test set-up for determining the force which, normally applied, is required to bring about a 90° bend with the pin supported cantilever fashion adjacent the head but with the shank being otherwise unsupported;

FIG. 10a is a fragmentary section taken along line 10a—10a in FIG. 10.

While the invention has been described in connection with a preferred embodiment, it will be understood that we do not intend to be limited to such embodiment but intend, on the contrary, to cover the various alternative and equivalent forms of the invention included within the spirit and scope of the appended claims.

Turning now to FIGS. 1-5 there is shown, somewhat enlarged, a cutter pin 10 constructed in accordance with the invention having a shank 11 with a head 12 integrally formed at one end and a tip portion 13 terminating in a tip 14.

The pin is smoothly tapered and is distinguished, in the preferred embodiment, by a set of evenly spaced flutes or grooves which extend longitudinally over a substantial portion of the length of the pin, the grooves being indicated at 21-24 in FIG. 4. The grooves are, as shown in that figure, arcuately bottomed so as to avoid any sharp change of section with resulting concentration of stress, and have a radial depth which is approximately proportioned to the thickness, being a maximum at the head and reduced to zero as the point of the pin is approached. The grooves 21-24 define between them a set of longitudinally extending ribs 31-34. It has been found that pins having a length between two inches and eight inches produce an acceptable cut, proportioned to the size of the carrier in which it is mounted. The pin is preferably about four to seven inches in length with a maximum shank diameter in the range of ¼ to ½ inch and a tip having a minimum diameter of 1/16 to 3/16 inch. A pin having the following overall dimensions has been found to work particularly well: Length—6 inches, maximum diameter of shank adjacent head—⅜ inch, tip diameter—⅛ inch.

The ribs have a width, at the face, which is approximately equal to the thickness of the tip of the pin. Preferably, also, the material of the pin is symmetrically disposed about the pin axis, for example, as shown in FIGS. 4 and 5, so that the tapered portion is sharply conical, with the shank having a material cross sectional area at least about twice the cross sectional area of the tip and a total cross sectional area, including flute area, of at least about four times the cross sectional area of the tip.

While pins of the present construction can be used in various forms of rotary carriers, there is set forth in FIGS. 6, 7 and 8 an exemplary environment in which the pins may be employed to take advantage of a combination of high cutting efficiency and improved safety. The mower in the present instance includes a frame 41 in the form of a shallow inverted enclosure having an encircling sidewall 42, a set of wheels 43, a handle 44 for propulsion and guidance and an engine 45 which may alternatively be an electric motor having a vertical drive shaft 46 which is conventionally threaded for receiving a clamping screw 47. A discharge chute 48 projects tangentially from one side of the housing to dispose of the clippings.

Secured to the drive shaft in horizontal position is a cutter support disc 50 which carries the cutting elements. Such a disc, which is preferably molded of durable and resiliently deformable plastic, has a circular central portion 51, an axially off-set, or wall, portion 52 and a peripheral portion 53 of relatively thin average cross section. Evenly spaced openings 57, 58, 59 are provided in the wall portion 52 of the disc for receiving pins in outwardly extending position. While it is preferred to employ a total of three pins in symmetrical positions, it will be understood that the invention is not limited thereto and that the invention may be practiced using only a single pin, or as many as four or five pins as a practical upper limit. The openings are dimensioned for a snug fit, so that the shank of each pin is supported, adjacent the head, cantilever fashion. Preferably forty to sixty percent of the length of each pin extends outboard of the disc.

In order to provide additional lateral support for the pin upon striking of an obstruction, the outer portion 53 of the disc is formed, its underside, with radially extending grooves aligned with the openings. Referring to the drawings, the grooves are indicated at 67, 68, 69 in respective alignment with the pin receiving openings 57, 58, 59. Taking the groove 67 as representative, and referring to FIG. 8, the groove has a relatively narrow neck 71 having a width which just slightly exceeds the diameter of the shank of the pin as well as a curved, outwardly flaring rear wall 72. The latter is of increasing curvature, tangentially faired or merged into the periphery of the disc, and serves as a support or backstop for the shank of the pin as the tip portion of the pin strikes an obstruction, for example, in the form of a large stone or other piece of debris D (FIG. 6). The bending of the pin against the curved wall serves to insure that the bend is distributed longitudinally of the pin so as to avoid the setting up of concentrated stress. The groove, in addition, has a front wall 73 adjacent the pin which is curved and outwardly flaring so that when the pin 10 is released tending, because of its resilience, to rebound in the forward direction, bending is distributed for avoidance of concentrated stress. Reference is made to copending application Ser. No. 714,982, filed Aug. 18, 1976 for a more complete discussion of the advantages in employing the present type of pin with a narrow groove of flaring, or trumpet, shape, but it will be understood by one skilled in the art that the improved pin, which is defined herein, has an inherent combination of advantages not possessed by prior pins making it possible to employ the pin, as an article of manufacture, in various types of rotary mower structures, either with or without a backstop surface.

The plastic material which the pin is made is preferably a "high performance" resilient plastic such as nylon, delrin and the like including such recently formulated materials as those identified as Z-801, Z-101, Z-71 and Z-42, all of such materials being available from E. I. Dupont de Nemours of Wilmington, Del. Z-801 is preferred because of its strength, resiliency, and relative freedom from abrasion and "notching". "Notching" is a term of art used to describe the tendency of a plastic material to break, by reason of concentrated stress, at a notch or similar surface injury which may occur during hard usage in the presence of ground obstructions, and resistance to notching in a material is defined by the "Izod Impact Strength" of the material (ASTM Method D-256). In the preferred embodiment, it is desirable to use a material for the pin which has a high Izod Impact Strength, for example, 10 foot-pounds per inch or greater, with the minimum preferred Impact Strength being about 2 foot-pounds/inch as determined in accordance with ASTM Method D-256 under conditions of 73° F. and 50 percent relative humidity.

Since the stress-strain characteristics may vary with the type of material, in addition to thickness and degree of taper, it is accordingly desirable to define the invention in terms of the "bending modulus" of the pin. The bending modulus is a well-known parameter used in defining beam characteristics and can be used to predict deflection of a beam under loaded conditions. Bending modulus defines the deflection characteristics of a cantilever beam in terms of the moment of inertia of the beam structure and the flexural modulus of the beam material. Bending modulus is the product of the second area moment of inertia (I) multiplied by the flexural modulus. Moment of inertia is determined from the cross section of the beam at a specific location on the beam in accordance with the formula $$I = \int_0^\infty - y^2 dA,$$

where "dA" is a small discreet area within the cross section and "y" is the distance of dA from the neutral axis of the beam. The flexual modulus is a material property and can be determined in accordance with A.S.T.M. test method D-790 at 50 percent relative humidity and 73° F.

It has been determined that the pins should be of such cross section and taper so as to exhibit a minimum bending modulus of 50 in.$^2$-lb. in the shank (see FIG. 5) and a maximum bending modulus of 30 in.$^2$-lb. adjacent the tip. It is preferred that the pin have a minimum being modulus of 70 in.$^2$-lb. in the shank and a maximum bending modulus of 10 in.$^2$-lb. adjacent the tip. Also, the bending modulus from the shank to the tip should decrease in a uniform manner, showing that the pin is gradually more flexible in progressing from the shank to the tip.

A pin such as shown in FIG. 1 having a shank diameter of $\frac{3}{8}$ inch and a tip diameter of $\frac{1}{8}$ inch which is made of the above mentioned Z-801 material has a bending modulus of about 85.2 in.$^2$-lb. in the shank and 0.48 in.$^2$-lb. adjacent the tip. The moment of inertia in the shank is $5.68 \times 10^{-4}$ in$^4$ and adjacent the tip is $3.22 \times 10^{-6}$ in$^4$. The flexual modulus of material Z-801 at 50 percent RH and 73° F. is 150,000 PSI. A pin having the same shape made from the above-mentioned material Z-42, which has a flexural modulus of 175,000 PSI, has a bending modulus of 99.4 in.$^2$-lb. in the shank and 0.56 in.$^2$-lb. adjacent the tip.

The bending modulus within a particular range defines a pin having the necessary degree of stiffness to insure efficient cutting of grass and weeds combined with sufficient resilience, or flexibility, to yield in the face of an obstruction to reduce damage or injury. Thus protection is afforded upon striking of an obstruction as a stake, root, or rock anchored in the ground, or upon the striking of the inadvertently interposed hand or foot of the user. The factor of yieldability, combined with an extremely narrow profile and low mass, is also important in reducing the size, velocity, and number of the stones or the like which may be ejected from the mower either through the chute or from below the enclosure.

Several other parameters which may be used to define characteristics of the pin are termed "initial deflection modulus" and "90° bending force". The initial deflection modulus is the ratio of the deflection of the free end of the pin to the force applied perpendicularly to the axis of the pin at the free end to produce such deflection, expressed in units of inches per pound. The 90° bending force is the force in pounds required to bend a pin in a 90° arc as shown in FIG. 10.

The initial deflection modulus and 90° bending force may be conveniently specified by use of jigs of fixtures of the type set forth respectively in FIGS. 9 and 10. In FIG. 9 the pin 10 is gripped cantilever fashion adjacent the head 12, and over a distance of about an inch, by means of a clamp 80 having separable mated halves 81, 81 (see FIG. 9a) and which is clamped upon a vertical support 83 by means of screws 84. Inscribed upon the support is a scale 85 which, while arcuate, is calibrated in terms of units of vertical deflection.

The initial deflection modulus can be determined by hanging a weight W1 from the tip 14 of the pin to produce an initial deflection. The deflection produced, the amount of weight required, and the projecting length of the pin can then be used to calculate the initial deflection modulus for that pin. It has been found that in pins made of Z-801 nylon at 50 percent RH and 73° F., having a shank diameter of 0.375, a tip diameter of 0.125, and a taper and cross section as shown in FIG. 1, with a projecting length of five inches, a weight W1 of 0.2 pounds hung from the tip of the pin, the pin deflects about 0.28 inch, whereby the initial deflection modulus is 1.4 inches per pound. It has been determined that the pins preferably should be of such cross section and taper so as to exhibit an initial deflection modulus in the range of 0.5 to 3.0 inches per pound. Preferably the initial deflection modulus is within the stated range measured in all transaxial directions.

For determining the 90° bending force which characterizes the present invention a test fixture is preferred as set forth in FIG. 10. Here the same clamp 80 may be employed as is used in FIG. 9 but rotated at 90° so that the pin projects vertically.

For applying force to the pin a horizontally extending arm 90 is used, horizontally pinned at 91 to a bracket 92. The arm 90 has a groove 93 formed in its underside. At the outer, or right hand, end of the arm 90 is a reference index 95 which cooperates with the lower edge of the arm and which is horizontally aligned with the arm pivot 91. Both the arm pivot and the index are preferably located above the clamp 80 by a distance which is related to length L of the pin, specifically, the amount $2L/\pi$. Moreover, means are provided for applying force downwardly upon the arm at a point which is spaced horizontally by a distance $2L/\pi$ from the initial location of the pin axis. For applying the force, indicated at W2, a yoke 96 is used which is pinned to the arm by a transversely extending pin 97 (FIG. 10a).

In use, the groove 93 is lubricated and the arm is swung clockwise engaging the tip of the pin in the groove. Weight is added at W2 in increments until the arm is horizontal, that is, until the underside of the arm coincides with the index 95. This is the force required to bend the pin through an angle of 90° or, alternatively, to bend the pin so that its effective length, measured parallel to the axis of the unstressed pin, is reduced to $2L/\pi$. It is found that a pin as described above has a 90° bending force of 3.75 pounds and that a pin should, in accordance with the present invention, have a 90° force characteristic which lies between 1.5 and 10.0 pounds.

It may be noted that the test fixtures set forth in FIGS. 9 and 10 do not employ any backstop or frontstop of the type provided in the exemplary form of the disc earlier described. The reason for this is that the pins having the characteristics of the present invention need not, necessarily, be employed in structures having the particular backstop and frontstop provisions shown, for example, in FIG. 8. Indeed, pins having the characteristics of the present invention may be successfully used if desired with pure cantilevered, or concentrated, support as contrasted with the distributed support shown in FIG. 8.

While it is preferred to make the pin of cruciform cross section, it will be apparent that the invention is not limited thereto; for example, one or more of the grooves 21–24 may be omitted without departing from the invention. Thus the pin may have just one rib—or a groove and rib may be added to make a total of five ribs. Where the shank is of non-circular section, the head 12 is preferably enlarged and "flatted" (FIG. 4) or the like for registration purposes, that is, to insure that a rib is oriented forwardly to present a relatively concentrated cutting edge.

It will be understood by one skilled in the art that pins constructed in accordance with the invention, and having the characteristics described above, are not claimed to provide a perfect degree of safety. A pin, as defined, and rotated at normal rotary mower speeds, striking a hand or foot is capable of delivering a painful blow. But the injury, instead of being severe, is more likely to be of a superficial nature. Indeed, where a hand is protected by a glove or a foot is protected by a shoe any injury is expected to be minimal. Nonetheless, it is found that pins defined in accordance with the invention, and rotated at normal mower speeds, have a high degree of grass cutting efficiency, an efficiency which approaches that of a steel blade which has been in use for a period of time. In short, when employing the present invention any sacrifice in cutting efficiency is only a minor tradeoff for a large gain in safety.

The pin is self-protecting even when striking a fixed obstruction because of its yieldability and because of the small amount of mass, or momentum, which it possesses. Upon "wiping by" the obstruction there may be some abrading action depending upon the degree of protection, such as an overhanging ledge, provided on the supporting disc. But even where a pin, constructed of high performance plastic, is relatively unshielded, it is, by reason of its physical bending characteristics, largely self-protected. Wear tends to be concentrated at the very tip and tends to have a self-sharpening effect. Pins of the present type may be employed for many hours of hard usage before the tip portion becomes so short as to make replacement advisable.

While the taper of the pin is preferably linear over the entire length, the invention is not limited thereto, and the taper may be non-linear (slightly concave or convex) and may start at a point separated from the head, if desired, without departing from the invention, as long as the pin falls within the claimed ranges of bending modulus. Thus by "smoothly tapered" is meant a gradual, but not necessarily linear, variation in thickness as a function of length over the tapered range, and by "smoothly distributed curvature" is meant freedom from sudden discontinuities of curvature. The term "head" denotes the retaining means at the inner end of the pin, whether enlarged or not. By "substantially straight" is meant that the pin is free of the "curl" which distinguishes a filament fed from a spool. The term "plastic" includes tough, flexible organic materials having a density which is characteristic of synthetic plastics in general, exhibiting abrasion resistance comparable to the high performance synthetic materials already mentioned and capable of self-restoration to a generally radial position after bending at right angles.

The present pin is distinguished over plastic cutter elements of the filamentary type by its freedom from drooping under its own weight. In use, it is distinguished by the fact that it will maintain a downwardly angled orientation, with the head portion anchored cantilever-fashion and the tip pointed outwardly and downwardly at a shallow angle from the disc or other support, during rotation at cutting speed, notwithstanding the tendency of centrifugal force to elevate the pin to the plane of its region of attachment.

We claim:

1. As an article of manufacture for use in the cutter disc of a rotary lawn mower having cantilevered pin anchoring means spaced inwardly from the periphery, a cutter pin of durable resilient plastic comprising, in combination, a relatively thick shank, the shank terminating at its outer end in a relatively thin but stiffly resilient tip portion for extending outwardly from the periphery of the disc to provide a cutting edge, the shank having a head at its inner end for retaining the pin in the pin anchoring means, the pin being substantially straight and having sufficient stiffness as to be able to support itself cantilever fashion free of any drooping of the tip under its own weight and having sufficient stiffness as to maintain orientation at a downward angle during rotation notwithstanding the tendency of centrifugal force to elevate the pin to the plane of its region of attachment, the pin being of tapered construction with the taper being so extensively distributed over a substantial portion of the length dimension and of such uniformity that upon striking a weighty obstruction the pin yields by bending backwardly with smoothly distributed curvature to safely wipe-by the obstruction.

2. The pin as claimed in claim 1 in which the pin is formed with at least one radially projecting rib which serves as a concentrated cutting edge for the pin, the rib being bounded by a pair of longitudinally-extending flutes which extend longitudinally over the major portion of the length of the pin.

3. The pin as claimed in claim 1 in which the pin is formed with at least one radially projecting rib which serves as a concentrated cutting edge for the pin, the rib being bounded by a pair of flutes which extend longitudinally over the major portion of the length of the pin, the flutes having a radial depth which varies approximately in proportion to the thickness of the pin.

4. The pin as claimed in claim 1 in which the two to five laterally spaced ribs extending longitudinally over the major portion of its length, the ribs defining between them an equal number of longitudinally extending flutes of a radial depth which varies approximately in proportion to the thickness of the pin.

5. The pin as claimed in claim 1 having a length within the range of four to seven inches and in which the maximum diameter of the shank is within the range of ½ to ¼ inch and in which the tip diameter is within the range of 3/16 to 1/16 inch.

6. The combination as claimed in claim 1 in which the pin cantilever supported adjacent the head has an initial deflection modulus, being the ratio of lateral deflection of the tip to the force which produces it, within the range between 0.5 to 3.0 inches per pound of bending force.

7. an article of manufacture for use in the cutter disc of a rotary lawn motor having a cantilevered pin anchoring means, a cutter pin of durable resilient plastic comprising, in combination, a relatively thick shank, the shank terminating at its outer end in a relatively thin but stiffly resilient tip portion for providing a cutting edge, the shank having a head at its inner end for retaining the pin for cantilevered support in the anchoring means, the material of the pin being symmetrically disposed about the pin's central axis, the shank of the pin being approximately ⅜ inch in outside diameter in the region adjacent the head, the pin being approximately six inches in length, the pin being of tapered construction with the taper being so uniformly distributed over a substantial portion of the length dimension that upon striking a weighty obstruction the pin yields by bending backwardly with smoothly distributed curvature to safely wipe-by the obstruction.

8. The combination as claimed in claim 7 in which the pin has an initial deflection modulus in all transaxial direction, being the ratio of lateral deflection of the tip to the force which produces it, within the range between 0.5 to 3.0 inches per pound of bending force.

9. An article of manufacture for use in the cutter disc of a rotary lawn mower having cantilever anchoring means for a cutter pin, a cutter pin of durable resilient plastic comprising, in combination, a relatively thick shank, the shank terminating at its outer end in a relatively thin but stiffly resilient tip portion providing a cutting edge, the shank having a head at its inner end for retaining the pin in the anchoring means, the pin being of tapered construction and having longitudinal ribs bounded by longitudinal flutes extending over a portion of its length.

10. The pin as claimed in claim 9 in which the pin has four symmetrically arranged ribs in cruciform cross section separated by flutes of generally arcuate profile.

11. As an article of manufacture for use in a cutter disc of a rotary lawn mower having a plurality of radially extending pin openings spaced inwardly from the periphery, a cutter pin of durable resilient plastic comprising, in combination, a relatively thick shank, the shank terminating at its outer end in a relatively thin but stiffly resilient tip portion for extending outwardly from the periphery of the disc to provide a cutting edge, the shank having a head on its inner end for retaining the pin in the pin openings, the pin being of tapered construction with the taper being so uniformly distributed over a substantial portion of the length dimension that upon striking a weighty obstruction the pin may yield by bending backwardly with smoothly distributed curvature to safely wipe-by the obstruction, the pin, upon being cantilever supported adjacent the head, having an initial deflection modulus, being the ratio of lateral deflection of the tip to the force which produces it, within the range between 0.5 to 3.0 inch per pound of bending force.

12. As an article of manufacture for use in a cutter disc of a rotary lawn mower having cantilever anchoring means for a cutter pin, a cutter pin of durable resilient plastic comprising, in combination, a relatively thick shank, the shank terminating at its outer end in a relatively thin but stiffly resilient tip portion for extending outwardly from the periphery of the disc to provide a cutting edge, the shank having a head on its inner end for retaining the pin in the anchoring means, the pin being of tapered construction with the taper being so uniformly distributed over a substantial portion of the length dimension that upon striking a weighty obstruction the pin may yield by bending backwardly with smoothly distributed curvature to safely wipe-by the obstruction, the pin having a minimum bending modulus of 50 in.$^2$-lb. in the shank and a maximum bending modulus of 30 in.$^2$-lb. adjacent the tip and a smoothly decreasing bending modulus from the shank to the tip.

13. As an article of manufacture for use in a cutter disc of a rotary lawn mower having cantilever anchoring means for a cutter pin, a cutter pin of durable resilient plastic comprising, in combination, a relatively thick shank, the shank terminating at its outer end in a relatively thin but stiffly resilient tip portion for extending outwardly from the periphery of the disc to provide a cutting edge, the shank having a head on its inner end for retaining the pin in the anchoring means, the pin being of tapered construction with the taper being so uniformly distributed over a substantial portion of the length dimension that upon striking a weighty obstruction the pin may yield by bending backwardly with smoothly distributed curvature to safely wipe-by the obstruction, the pin having a minimum bending modulus of 70 in.$^2$-lb. in the shank and a maximum bending modulus of 10 in.$^2$-lb. adjacent the tip and a smoothly decreasing bending modulus from the shank to the tip.

14. As an article of manufacture for use in a cutter disc of a rotary lawn mower having a plurality of radially extending pin openings spaced inwardly from the periphery, a cutter pin in the form of a shank having a head at one end and smoothly tapering to a tip portion at its other end, the pin being from four to seven inches in length, the maximum thickness of the shank lying within the range of $\frac{1}{4}$ to $\frac{1}{2}$ inch, the thickness of the tip lying within the range of 1/16 to 3/16 inch, the minimum bending modulus in the shank being 50 in.$^2$-lb. and the maximum bending modulus adjacent the tip being 30 in.$^2$-lb.

15. As an article of manufacture for use in a cutter disc of a rotary lawn mower having cantilever anchoring means for a cutter pin, a cutter pin of durable resilient plastic comprising, in combination, a relatively thick shank, the shank terminating at its outer end in a relatively thin but stiffly resilient tip portion for extending outwardly from the periphery of the disc to provide a cutting edge, the shank having a head on its inner end for retaining the pin in the anchoring means, the pin being of tapered construction with the taper being so uniformly distributed over a substantial portion of the length dimension that upon striking a weighty obstruction the pin may yield by bending backwardly with smoothly distributed curvature to safely wipe-by the obstruction, the pin having a minimum modulus of 50 in.$^2$-lb. in the shank and a maximum bending modulus of 30 in.$^2$-lb. adjacent the tip and a smoothly decreasing bending modulus from the shank to the tip, the tip portion having a minimum Izod Impact Strength of 2 foot-pounds per inch.

16. As an article of manufacture for use in a cutter disc of a rotary lawn mower having cantilever anchoring means for a cutter pin, a cutter pin comprising, in combination, a shank having a head at one end, and a smoothly tapering tip portion at its other end, at least the shank being of longitudinally fluted construction, the tip portion being from four to seven inches in length, the thickness of the shank being in the range of $\frac{1}{4}$ to $\frac{1}{2}$ inch, the thickness of the tip lying within the range of 1/16 to 3/16 inch, the minimum bending modulus in the shank being 50 in.$^2$-lb. and the maximum bending modulus adjacent the tip being 30 in.$^2$-lb. and a smoothly decreasing bending modulus from the shank to the tip, the tip portion having a minimum Izod Impact Strength of 2 foot-pounds per inch at 50 percent relative humidity and 73° F., so that upon striking a weighty obstruction the pin yields by bending backwardly with smoothly distributed curvature and does not readily fracture upon being notched or cut.

* * * * *